United States Patent
Hurt et al.

(10) Patent No.: US 6,623,179 B2
(45) Date of Patent: Sep. 23, 2003

(54) ELECTRO-OPTICAL DATA TRANSFER MODULE

(75) Inventors: Hans Hurt, Regensburg (DE); Klaus Panzer, Regensburg (DE); Gustav Müller, Regensburg (DE); Olaf Schönfeld, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/767,400

(22) Filed: Jan. 22, 2001

(65) Prior Publication Data

US 2002/0061174 A1 May 23, 2002

(30) Foreign Application Priority Data

Jan. 21, 2000 (DE) .......................... 100 02 521

(51) Int. Cl.[7] .............................. G02B 6/42
(52) U.S. Cl. .................. 385/92; 385/88; 385/89; 385/92; 250/239; 257/81
(58) Field of Search ................. 385/88, 89, 90, 385/91, 92; 250/239; 257/80–82, 84

(56) References Cited

U.S. PATENT DOCUMENTS

| | | | |
|---|---|---|---|
| 5,040,868 A | | 8/1991 | Waitl et al. .................. 358/33 |
| 5,579,426 A | * | 11/1996 | Li et al. ....................... 385/88 |
| 5,661,835 A | * | 8/1997 | Kato et al. .................... 385/33 |
| 5,781,682 A | * | 7/1998 | Cohen et al. .................. 385/89 |
| 5,864,468 A | | 1/1999 | Poplawski et al. .......... 361/753 |
| 5,907,151 A | | 5/1999 | Gramann et al. ......... 250/214.1 |
| 6,243,508 B1 | * | 6/2001 | Jewell et al. ................. 385/14 |
| 6,302,596 B1 | * | 10/2001 | Cohen et al. ................. 385/93 |

FOREIGN PATENT DOCUMENTS

| | | |
|---|---|---|
| DE | 34 37 904 A1 | 4/1986 |
| DE | 195 25 415 C2 | 1/1997 |
| DE | 195 34 936 C2 | 3/1997 |
| DE | 197 11 138 A1 | 9/1998 |
| EP | 0 458 493 B1 | 11/1991 |
| EP | 0 644 669 A1 | 3/1995 |
| JP | 10 041 540 | 2/1998 |
| WO | WO 99/07023 | 2/1999 |

* cited by examiner

Primary Examiner—Michael C. Zarroli
(74) Attorney, Agent, or Firm—Laurence A. Greenberg; Werner H. Stemer; Ralph E. Locher

(57) ABSTRACT

An electro-optical data transmission module comprises at least a first SMT housing (11) and a second SMT housing (13). A surface-emitting laser light emitter chip is accommodated in the first SMT housing (11), and a light-sensitive light receiver chip is accommodated in the second SMT housing (13). By virtue of the modular design which is formed from at least two individual SMT housings, the electro-optical data transmission module can be implemented with a minimum size.

12 Claims, 4 Drawing Sheets

ELECTRO-OPTICAL DATA TRANSFER MODULE

BACKGROUND OF THE INVENTION

FIELD OF THE INVENTION

The invention relates to an electro-optical data transmission module with a laser light emitter chip and a light receiver chip.

Such a data transmission module is known, for example, from U.S. Pat. No. 5,864,468.

A difficulty when designing such modules is that, on the one hand, they should be able to cope with as high a data transmission rate as possible (500 Mbps and more), and on the other hand they should be as small as possible—in particular also owing to their increased use in the electronics of consumer goods. These two requirements are difficult to reconcile. This is because, in the first instance, such high-rate modules require a robust design, for which reason, known modules are embodied with a housing which takes up a relatively large amount of space. A further reason which runs counter to the desired miniaturization is that the edge-emitting semiconductor lasers which are used in such modules at present have relatively high power requirements. For this reason, in order to avoid electronic crosstalk between the transmitter components and the receiver circuit it is necessary to maintain a certain minimum spacing. A third reason for the fact that conventional modules require a large amount of space is that the high power drain of the laser light emitter chip results in the need for special driver circuits for the conventional electro-optical data transmission modules. These driver circuits are generally arranged within the module housing and increase its overall size further.

SUMMARY OF THE INVENTION

The invention is based on the object of specifying an electro-optical data transmission module with a laser light emitter chip and a light receiver chip which is suitable for the optical transmission of data at data rates in the range of 500 Mbps (multimedia) and requires little space.

Accordingly, a significant aspect of the invention is that a surface-emitting laser light emitter chip is used as the transmitter component. Surface-emitting laser light emitter chips, so-called VCSELs (Vertical Cavity Surface Emitting Lasers), have a significantly lower power drain than comparable edge-emitting laser chips. As a result of the low power drain, the problem of electronic crosstalk is significantly reduced, i.e. the light receiver chip and the circuits (preamplifier, post-amplifier) connected downstream of it can be mounted closer to the transmitter circuit.

A further measure which is essential for the objective of the invention consists in the fact that both the surface-emitting laser light emitter chip and the light-sensitive light receiver chip are accommodated in separate SMT (Surface Mounting Technology) housings. This permits a compact, modular and mechanically stable design of the electro-optical data transmission module.

Both known measures (surface-emitting laser light emitter chip and individual SMT housings for the emitter chip and receiver chip) make it possible to provide an electro-optical data transmission module with a data transmission rate of approximately 500 Mbps and more and a high degree of miniaturization.

According to one particularly preferred embodiment, the electro-optical data transmission module comprises a securing means which mechanically connects the two SMT housings. The securing means may be, for example, a module housing which surrounds the two SMT housings and/or an attachment device arranged between the two SMT housings. In both cases, the securing means permits the first SMT housing to be adjusted with respect to the second SMT housing, i.e. permits the transmission light beam paths and reception light beam paths to be adjusted.

A further preferred refinement of the invention is characterized in that the data transmission module also comprises a light guide extension element which is accommodated in a third SMT housing. As a result, the modularity of the entire design is increased further.

The SMT housings are preferably parallelepiped-shaped or cuboid. A robust data transmission module according to the present invention can then be obtained by simply combining the housing cubes/parallelepipeds.

In an arrangement composed of a circuit board and an electro-optical data transmission module mounted on it, one advantageous embodiment is characterized in that a driver circuit for the surface-emitting laser light emitter chip is mounted outside the data transmission module on the circuit board. The relocation of the driver circuit outside the electro-optical data transmission module permits the module dimensions to be reduced, both by virtue of the saving in space which is achieved in this way and also by virtue of the reduction in the electronic crosstalk within the module.

A further arrangement of the data transmission module and circuit peripherals which is advantageous in terms of miniaturization is characterized in that a preamplifier circuit for the light-sensitive light receiver chip is arranged inside the second SMT housing, and in that a post-amplifier circuit for the light-sensitive light receiver chip is mounted outside the data transmission module on the circuit board. The saving in space is brought about by the relocation of the post-amplifier circuit.

Further preferred refinements of the invention are given in the subclaims.

The invention is explained in more detail below by means of an exemplary embodiment and variants of the same with reference to the drawing, in which:

DESCRIPTION OF THE PREFERRED EMBODIMENT

Figure 1:
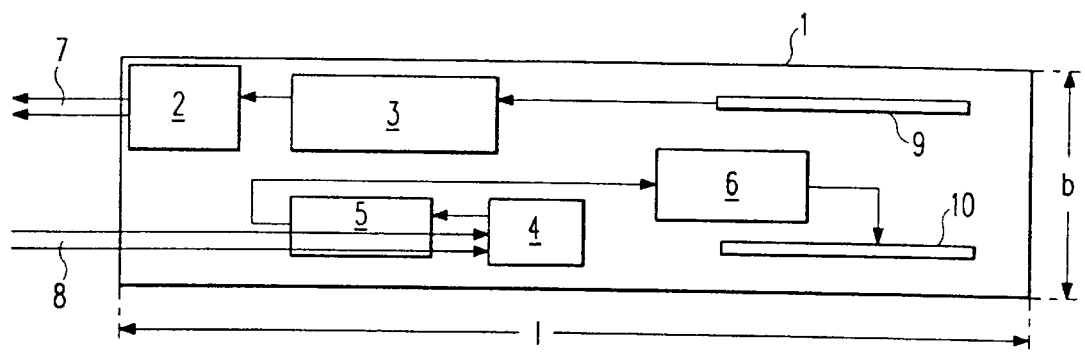
FIG. 1 shows a schematic, plan view of a data transmission module according to the prior art.

According to FIG. 1, a known electro-optical data transmission module which is used for receiving and transmitting data rates in the region of 500 Mbps, comprises a housing 1 in which a semiconductor laser 2 with upstream driver circuit 3, and a photodiode 4 with a downstream preamplifier 5 and a post-amplifier 6 are arranged. The laser light which is emitted by the laser 2, an edge emitter, is designated by the reference number 7, incident laser light which is incident on the photodiode 4 is provided with the reference number 8. Connecting elements 9 and 10 are used for the electrical connection of the data transmission module to electrical peripheral devices.

Owing to the difficulties described above (mechanical stability, electronic crosstalk), it has previously not been possible to reduce the dimensions of such modules to sizes below approximately 1 cm in width b, and 5 cm in length l.

Figure 2:
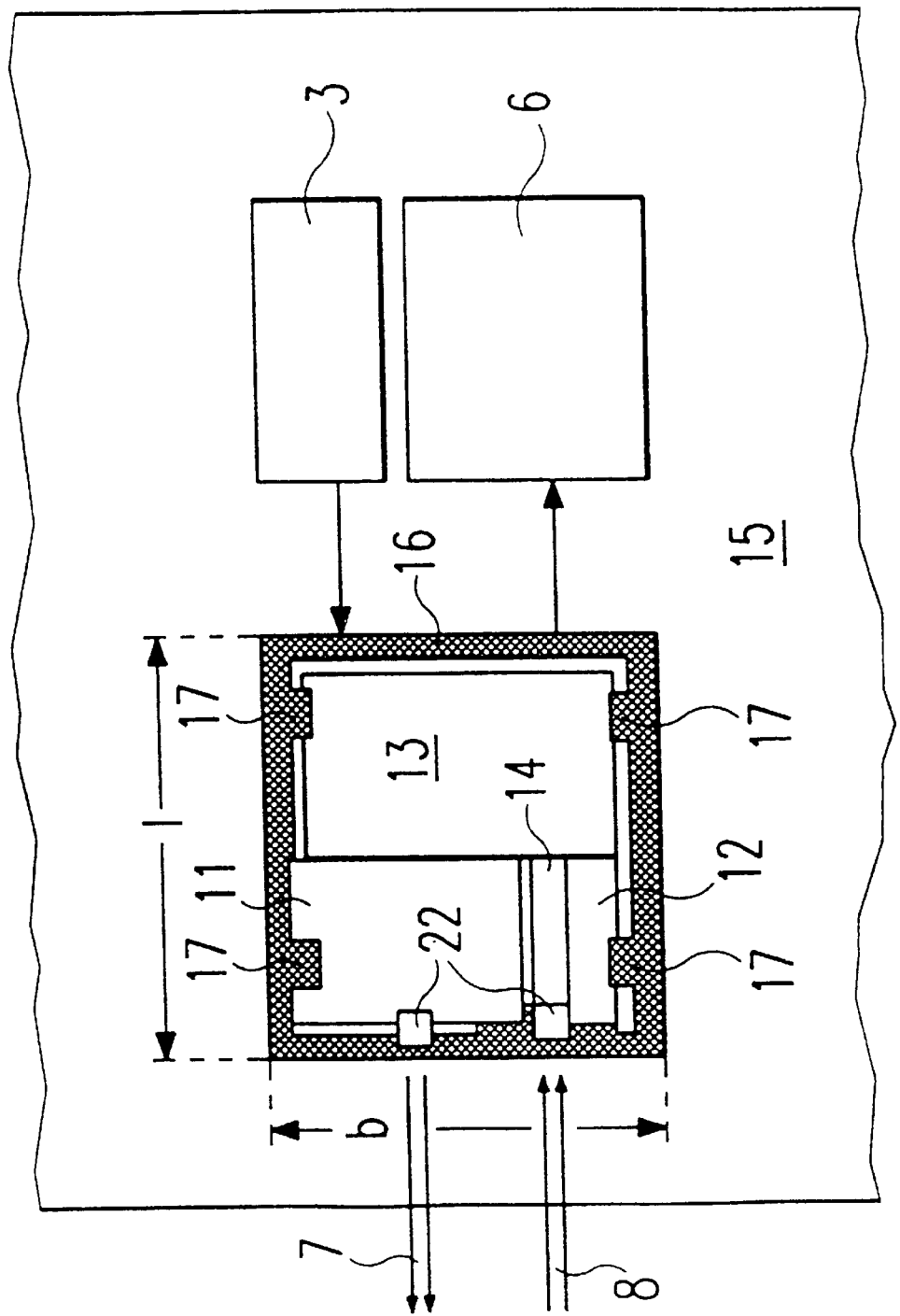
FIG. 2 shows a schematic, plan view of a data transmission module according to the invention.

FIG. 2 shows a schematic, plan view of an arrangement composed of three SMT submodules which are combined to form a data transmission module according to the invention. Comparable parts to those in FIG. 1 are provided with the same reference numerals.

The electro-optical data transmission module comprises three SMT housings, 11, 12, 13 which each have a rectangular horizontal projection and bear one against the other, essentially without gaps, at side walls in the manner illustrated.

The first SMT housing 11 contains a laser light emitter chip in the form of a VCSEL (not illustrated), the second SMT housing 13 contains a light-sensitive light receiver chip and a preamplifier (not illustrated), and the third SMT housing 12 contains an optical extension 14.

The three SMT housings 11, 12, 13 are mounted on a circuit board 15 of which part is illustrated. The SMT housings 11, 12, 13 are surrounded by a plug-on mount 16. The SMT housings 11, 12, 13 can be adjusted with respect to one another by means of guide projections 17 which are mounted on the inner circumference of the plug-on mount 16 and which engage in complementary sliding grooves (not illustrated) on the outer side walls of the SMT housings 11, 12, 13.

Figure 5:
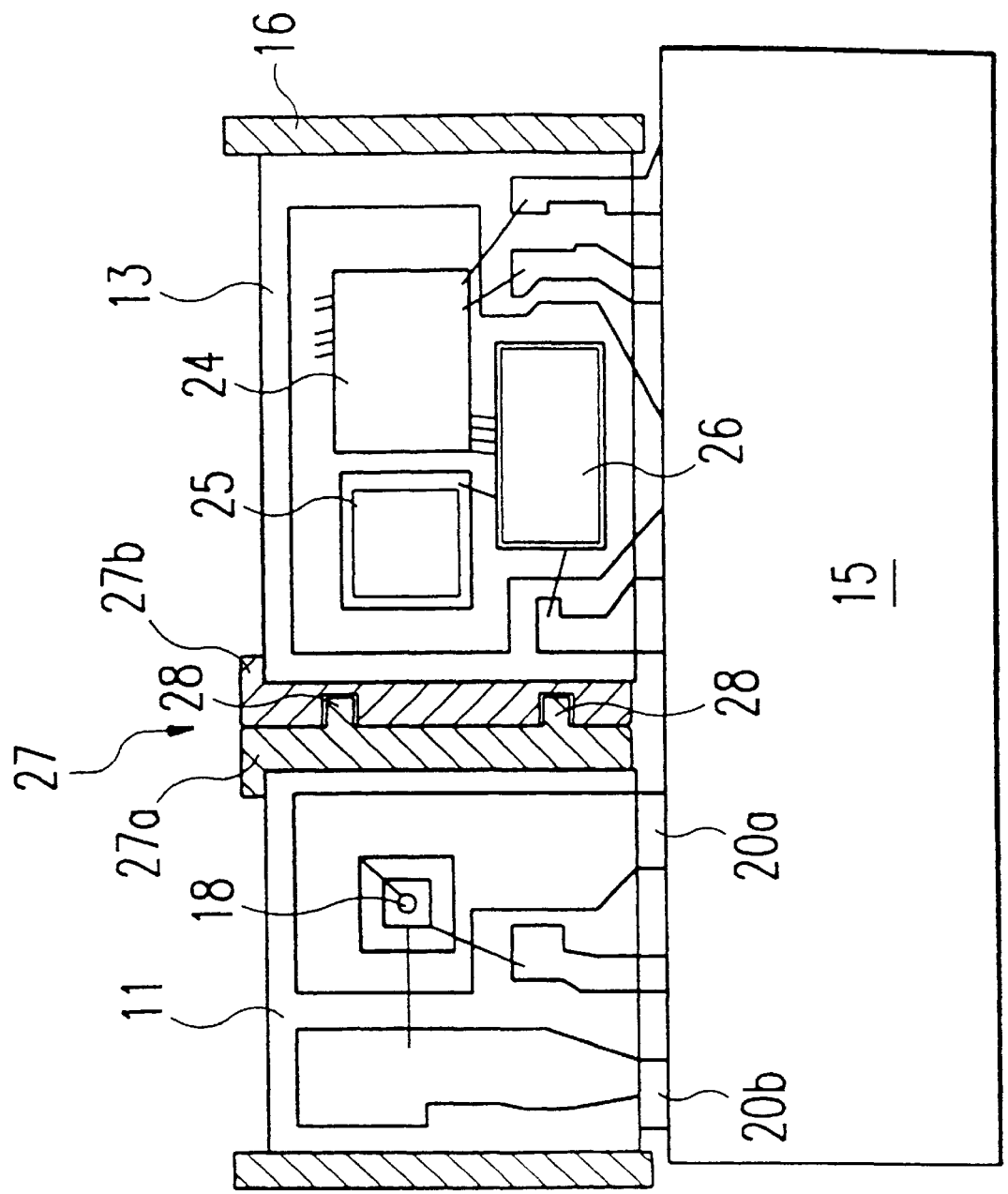
FIG. 5 shows a schematic front view of a data transmission module with broken-open module housing surround.

Another possible means of adjusting the SMT housings 11, 12, 13 with respect to one another is joining the housings 11, 12, 13 at their side walls which point toward one another by means of attachment devices (see FIG. 5). Both measures (plug-on mount 16 and attachment to side walls which point toward one another) can also be implemented simultaneously.

The injection and extraction of light is carried out by means of fiber terminals 22 which pass through the front of the plug-on mount 16.

The driver circuit 3 and the post-amplifier 6 are located outside the plug-on mount 16. The driver circuit 3 can, if appropriate, be eliminated completely by virtue of the low power requirement (approximately 10 mA) of the surface-emitting laser light emitter chip according to the invention.

The data transmission module according to the invention (illustrated in FIG. 2) has a width b=5 mm and a length l=7 mm.

To produce the arrangement shown in FIG. 2, the SMT housings 11, 12, 13 are firstly joined and then mounted on the circuit board 15. The plug-on mount 16 is subsequently pushed over the three SMT housings 11, 12, 13.

Figure 3:
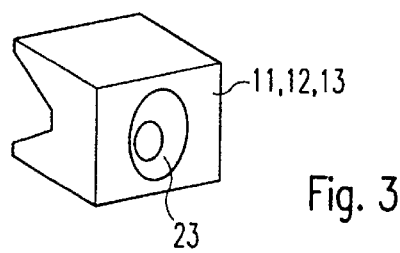
FIG. 3 shows a perspective view of an SMT housing used in the data transmission module according to the invention.

FIG. 3 shows a perspective view of an SMT housing such as can be used for the SMT housings 11, 12, 13. The housing is composed of plastic and is formed with planar side walls arranged at a right angle with respect to one another. In a front side wall there is a built-in depression 23 in which the respective functional element surrounded by the housing is arranged. The modularity of the entire concept is supported by the essentially uniform shaping of the housings 11, 12, 13.

Figure 4A:
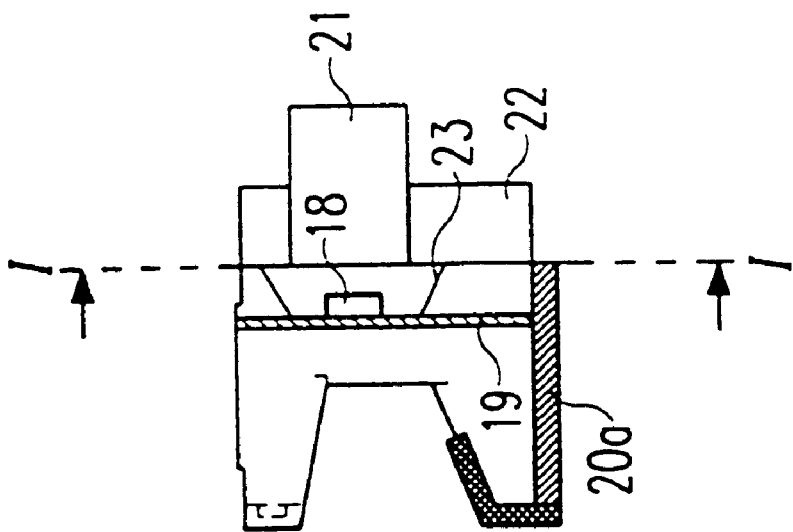
FIG. 4A shows a schematic longitudinal sectional view of the SMT housing of the laser light emitter chip.

FIG. 4A shows a longitudinal sectional view through the housing illustrated in FIG. 3. It is mainly concerned with the SMT housing 11 of the light transmitter. The VCSEL 18 is mounted on a metal carrier 19 which leads through to the underside of the SMT housing 11 and forms a first SMT contact face 20a there.

The laser light emitted by the VCSEL 18 enters an optical fiber 21 which is secured in the fiber terminal 22 which is arranged at the end of the SMT housing 11.

Figure 4B:
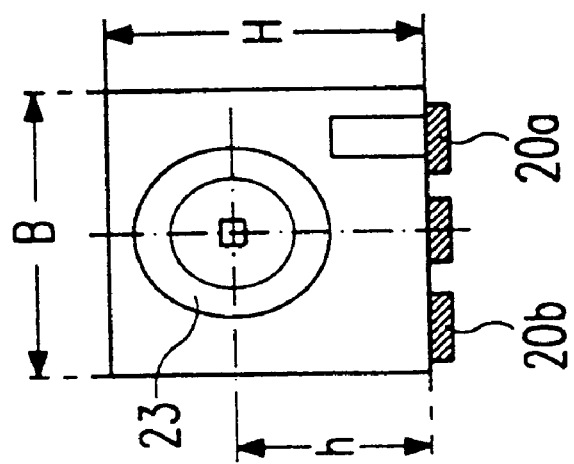
FIG. 4B shows a schematic cross-sectional view along the line I—I in FIG. 4A.

The housing 11 illustrated in FIG. 4A is shown in section along the line I—I in FIG. 4b. In the example illustrated here, the height H of the SMT housing 11 is 3.8 mm, the width B of the housing 11 is approximately 3.2 mm and the height h of the optical axis (i.e. of the VCSEL 18) above the housing floor is approximately 2.8 mm.

A second SMT contact face 20b forms the mating contact with the first SMT contact face 20a.

FIG. 5 shows the front view of a variant (without a third SMT housing 12) of the electro-optical data transmission module according to the invention which is illustrated in FIG. 2, the front side wall of the plug-on mount 16 being not shown for illustrative reasons. In addition, the SMT housings 11 and 13 are illustrated in a transparent form in order to show the internal design of the corresponding components.

The transmission module accommodated in the first SMT housing 11 essentially corresponds, with the exception of the off-center arrangement of the VCSEL 18, to the transmission module shown in FIGS. 4A and 4B. Electrical contact with the VCSEL 18 is again made by means of the two SMT contact faces 20a and 20b.

The reception module which is accommodated in the second SMT housing 13 comprises both a photodiode 25 and a preamplifier 26. Other integrated circuits 24 may also optionally be provided if appropriate.

Between the SMT housings 11, 13 there is a plug device 27 which holds together the two housings 11, 13. The plug device 27 is composed of a first plug element 27a with plug projections 28 and a second plug element 27b with plug openings which are complementary to the plug projections. In the plugged-together state, the plug elements 27a, 27b bear one against the other in a positionally stable fashion. They can also be designed integral with the SMT housings 11, 13.

We claim:

1. An electro-optical data transmission module, comprising:
   a first SMT housing accommodating a surface-emitting laser light emitter chip;
   a second SMT housing accommodating a light-sensitive light receiver chip;
   a securing device mechanically connecting said first SMT housing and said second SMT housing; and
   a common circuit board supporting said first SMT housing and said second SMT housing.

2. The electro-optical data transmission module according to claim 1, wherein said securing device is a module housing surrounding said first housing and said second housing.

3. The electro-optical data transmission module according to claim 2, wherein said securing device is an attachment device configured between said first housing and said second housing.

4. The electro-optical data transmission module according to claim 1, wherein said first housing and said second housing have mutually supporting side walls.

5. The electro-optical data transmission module according to claim 1, wherein said first housing and said second housing each have a shape selected from the group consisting of a parallelepiped shape and a cuboid shape.

6. The electro-optical data transmission module according to claim 1, wherein said first housing and said second housing together define a lateral dimension in a first direction that is less than 1 cm and a lateral dimension in a second direction that is less than 1 cm.

7. An electro-optical data transmission module, comprising:
   a first SMT housing accommodating a surface-emitting laser light emitter chip;
   a second SMT housing accommodating a light-sensitive light receiver chip; and
   a third SMT housing accommodating a light guide extension element.

8. The electro-optical data transmission module according to claim 7, wherein said first housing, said second housing, and said third housing each have a shape selected from the group consisting of a parallelepiped shape and a cuboid shape.

9. The electro-optical data transmission module according to claim 7, wherein said first housing, said second housing, and said third housing have mutually supporting side walls.

10. An electro-optical data transmission module, comprising:
    a first SMT housing accommodating a surface-emitting laser light emitter chip; and
    a second SMT housing accommodating a light-sensitive light receiver chip;
    said first housing and said second housing together define a lateral dimension in a first direction that is less than 1 cm and a lateral dimension in a second direction that is less than 1 cm.

11. A configuration, comprising:
    a circuit board including a region having an electro-optical data transmission module mounted thereon, said electro-optical data transmission module including:
      a first SMT housing accommodating a surface-emitting laser light emitter chip and being surface mounted on said circuit board,
      a second SMT housing accommodating a light-sensitive light receiver chip and being surface mounted on said circuit board, and
      a securing device mechanically connecting said first housing and said second housing; and
    a driver circuit for said surface-emitting laser light emitter chip, said driver circuit mounted on said circuit board outside said region in which said data transmission module is mounted on said circuit board.

12. A configuration, comprising:
    a circuit board including a region having an electro-optical data transmission module mounted thereon, said electro-optical data transmission module including:
      a first SMT housing accommodating a surface-emitting laser light emitter chip, and
      a second SMT housing accommodating a light-sensitive light receiver chip;
    a driver circuit for said surface-emitting laser light emitter chip, said driver circuit mounted on said circuit board outside said region in which said data transmission module is mounted on said circuit board;
    a preamplifier circuit for said light-sensitive light receiver chip configured in said second SMT housing; and
    a post-amplifier circuit for said light-sensitive light receiver chip, said post-amplifier circuit mounted on said circuit board outside said region in which said data transmission module is mounted on said circuit board.

* * * * *